United States Patent
Song et al.

(10) Patent No.: US 11,255,056 B2
(45) Date of Patent: Feb. 22, 2022

(54) METHOD FOR RELIEVING VAULTED EXPANSION OF CEMENT-STABILIZED BASE LAYER THROUGH PRECUT SEAMS

(71) Applicant: Xinjiang Transportation Planning Surveying and Design Institute, Xinjiang (CN)

(72) Inventors: Liang Song, Xinjiang (CN); Teng Yuan, Xinjiang (CN); Yuxin Zhou, Xinjiang (CN); Yan Xu, Xinjiang (CN); Gang Guo, Xinjiang (CN); Shoulin Zhang, Xinjiang (CN); Guohua Li, Xinjiang (CN); Qiulin Tian, Xinjiang (CN); Hai Sun, Xinjiang (CN); Hongtai Yu, Xinjiang (CN); Yanyue Li, Xinjiang (CN); Peilin Shou, Xinjiang (CN); Lu Wang, Xinjiang (CN)

(73) Assignee: XINJIANG TRANSPORTATION PLANNING SURVEVYING AND DESIGN INSTITUTE, Urumqi (CN)

( * ) Notice: Subject to any disclaimer, the term of this patent is extended or adjusted under 35 U.S.C. 154(b) by 0 days.

(21) Appl. No.: 17/032,620

(22) Filed: Sep. 25, 2020

(65) Prior Publication Data
US 2021/0087754 A1    Mar. 25, 2021

(30) Foreign Application Priority Data
Sep. 25, 2019 (CN) .......................... 201910912985.8

(51) Int. Cl.
*E01C 11/00* (2006.01)
*E01C 11/06* (2006.01)
*E01C 11/04* (2006.01)

(52) U.S. Cl.
CPC .............. *E01C 11/06* (2013.01); *E01C 11/04* (2013.01)

(58) Field of Classification Search
CPC .................................. E01C 11/04; E01C 11/06
(Continued)

(56) References Cited

U.S. PATENT DOCUMENTS

| 11,127,135 B1* | 9/2021 | Mansell | ................. E01C 19/004 |
| 2015/0262374 A1* | 9/2015 | Huang | ...................... G06T 7/20 |
| | | | 382/103 |
| 2020/0282929 A1* | 9/2020 | Kroeger | ................. G01S 7/4021 |

FOREIGN PATENT DOCUMENTS

SE    WO2005068271    *    7/2005    ................ B60T 8/00

* cited by examiner

*Primary Examiner* — Raymond W Addie
(74) *Attorney, Agent, or Firm* — Dragon Sun Law Firm, PC; Jinggao Li, Esq.

(57) ABSTRACT

A method for relieving vaulted expansion of a cement-stabilized base layer through precut seams. The method firstly establishes an RBFN model according to a large number of observation results of a vaulted expansion amount of the cement-stabilized base layer under different conditions (such as temperature and a stress release structure) in Xinjiang and similar regions; and on such a basis, the vaulted expansion amount of the cement-stabilized base layer to be designed is predicted. When the vaulted expansion amount is greater than a control requirement, the RBFN model is configured to design a reasonable width and a reasonable interval of the precut wide expansion seams to ensure that the vaulted expansion amount of the cement-stabilized base layer is less than a control value. Based on the design of the RBFN model, the present invention provides a corresponding construction method for the precut wide expansion seams. The present invention can predict the

(Continued)

vaulted expansion of the cement-stabilized base layer without precut seams according to existing data.

6 Claims, 3 Drawing Sheets

(58) Field of Classification Search
USPC .............................. 404/17, 28–31, 46–64, 72
See application file for complete search history.

METHOD FOR RELIEVING VAULTED EXPANSION OF CEMENT-STABILIZED BASE LAYER THROUGH PRECUT SEAMS

TECHNICAL FIELD

The present invention belongs to the technical field of road construction, and particularly relates to a method for relieving vaulted expansion of a cement-stabilized base layer through precut seams.

BACKGROUND

After years of exploration, practice, and accumulation by traffic builders in China's Xinjiang Uygur Autonomous Region (hereinafter "Xinjiang"), a cement-stabilized base layer is well adapted to the dry and rainless climate characteristics of Xinjiang due to its advantages of wide distribution of its structural materials, easiness in exploration, better strength and rigidity and water stability. Most of the trunk roads in Xinjiang have adopted such a semi-rigid road surface base layer structure. A mixture of the cement-stabilized base layer is a temperature-sensitive material. When temperature changes, the cement-stabilized base layer will generate a thermal expansion and cold contraction phenomenon, resulting in a temperature stress and expansion and contraction deformation. In addition, a grading of the mixture, the cement performances, contents easily soluble salts, a compaction degree and the like have a certain effect on the deformation of the cement-stabilized base layer. In recent years, with the sustained and rapid development of economic society, the road traffic volume has increased rapidly, the thickness of a cement-stabilized base layer structure has gradually increased, and the strength requirements continuously increase. The problem of vaulted expansion and cracking of the cement-stabilized base layer is more and more obvious. The road surface diseases caused by the vaulted expansion and cracking of the cement-stabilized base layer has always been an urgent problem. In recent years, the cement-stabilized base layer of several highways built in southern Xinjiang has generated huge temperature stress and expansion deformation under the high-temperature weather conditions in summer after several years of operation, which causes the vaulted expansion and cracking of different degrees in the base layer of the road segments.

Therefore, by exploring the laws and causes of the vaulted expansion disease of the cement-stabilized base layer in Xinjiang, key technologies in the aspects such as prevention and control design for vaulted expansion, construction and maintenance of the cement-stabilized base layers of the highways in Xinjiang and similar regions are developed, and reasonable and practical improvement measures are provided. To minimize the diseases of the cement-stabilized base layers and prolong the service life of roads, prevention and treatment guidelines for the vaulted expansion of the cement-stabilized base layers are finally formed to guide the promotion of prevention and treatment technologies for the vaulted expansion of the cement-stabilized base layers in Xinjiang. A technical support is provided for the aspects such as design, construction and maintenance of the cement-stabilized base layers of the highways, and a contribution is made to the advancement of road traffic science and technology.

SUMMARY

An object of the present invention is to provide a technical support and guidance for controlling the vaulted expansion of cement-stabilized base layers in Xinjiang and similar regions, and there is provided a method for relieving the vaulted expansion of the cement-stabilized base layer through precut seams. The main content of the method includes: training of a radial basis function network (RBFN) model, using the RBFN model and performing a construction method for designing the precut seams.

Figure 1:
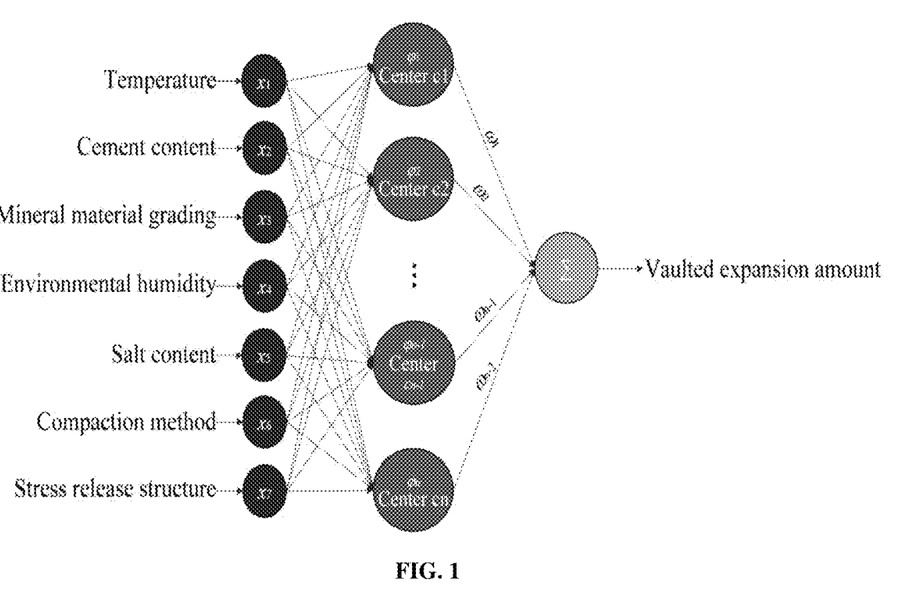
FIG. 1 is a neural schematic structural diagram of a radial basis function network (RBFN).

In order to achieve the above object, the present invention is implemented by adopting the following technical solution:

A method for relieving the vaulted expansion of a cement-stabilized base layer through precut seams includes the following steps:

1) training an RBFN model, that is, establishing a mapping relationship between vaulted expansion amounts of a cement-stabilized base layer and different conditions through automatic adjustment of model parameters according to the known vaulted expansion amounts of the cement-stabilized base layer under different temperatures and stress release structural conditions in a known region (such as Xinjiang); wherein the training of the RBFN model refers to the automatic adjustment of RBFN model parameters $w_k$ and $c_k$ according to a large number of vaulted expansion amounts of the cement-stabilized base layer under different conditions in the region, $w_k$ and $c_k$ are a parameter weight parameter and a kernel parameter of the RBFN model respectively, $k=1, \ldots, n$, and n is the number of center points, as shown in FIG. 1;

2) using the RBFN model, that is, according to the mapping relationship established in step 1), predicting the vaulted expansion amount of a cement-stabilized base layer under unknown conditions in the region (such as Xinjiang); and according to the RBFN model trained in step 1), predicting the vaulted expansion amount of a cement-stabilized base layer without wide expansion seam structures and the vaulted expansion amount of a cement-stabilized base layer with different wide expansion seam structures, thereby determining a reasonable width and a reasonable interval of the wide expansion seams; and 3) performing a construction method for designing precut seams, that is, designing precut wide expansion seams according to the vaulted expansion amount of the cement-stabilized base layer under unknown conditions in the region predicted in step 2); and according to the width and interval of the wide expansion seam determined in step 2), performing construction of the cement-stabilized base layer, wherein except for a construction process for the precut wide expansion seams, the remaining construction processes for the cement-stabilized base layer are the same as the traditional construction processes for the cement-stabilized base layer.

A further improvement of the present invention lies in that a specific implementing method of step 1) is as follows:

101) randomly assigning values to the RBFN parameters $w_k$ and $c_k$, an assignment range being [0, 1];

102) randomly selecting a group of vaulted expansion amount data set of the cement-stabilized base layer under different conditions in the region, wherein the data set includes two parts: an input condition part $x=(x_1, \ldots, x_9)$ and a target output value part y; $x_1$-$x_9$ are a construction temperature, a cement content, a mineral material grading, an environmental humidity, a controlled salt content, a compaction method, an expansion seam width and an expansion seam interval of the cement-stabilized base layer respectively; and the target output value part y is a group of measured vaulted expansion amounts of the cement-stabilized base layer;

103) predicting the vaulted expansion amount y' of the cement-stabilized base layer with the RBFN, wherein the process is as shown in formulas (1)-(3);

$$\varphi_k(x) = e^{-(\|x-c_k\|_2)} \quad (1)$$

$$\|x - c_k\|_2 = \frac{\sum_{i=1}^{9}(x_i - c_i^k)^2}{2} \quad (2)$$

$$y' = \sum_{k=1}^{n} \omega_k \varphi_k(x) \quad (3)$$

wherein in these formulas, $x=(x_1, \ldots, x_9)$ is the input condition, $c_k=(c_1^k, c_9^k)$ is the kernel parameter of a radial basis function in the RBFN model; $\|\ \|_2$ is a 2-norm operator; $c_i^k$ is an element of a $c_k$ vector, $i=1, \ldots, 9$; and $x_i$ is a certain element of the x vector, that is, a certain input value, $i=1, \ldots, 9$, which respectively corresponds to the construction temperature, the cement content, the mineral material grading, the environmental humidity, the controlled salt content, the compaction method, the expansion seam width, and the expansion seam interval of the cement-stabilized base layer;

104) calculating a prediction error and adjusting the parameters, wherein the process is as shown in formulas (4)-(8);

$$E(x) = y - y' \quad (4)$$

$$\frac{\partial E(x)}{\partial w_k} = -E(x)\varphi_k(x) \quad (5)$$

$$\frac{\partial E(x)}{\partial c_i^k} = \frac{\partial E(x)}{\partial w_k} 2e^{-(\|x-c_k\|_2)}(x_i - c_i^k) \quad (6)$$

$$w_k \Rightarrow w_k + \alpha \frac{\partial E(x)}{\partial w_k} \quad (7)$$

$$c_i^k \Rightarrow c_i^k + \alpha \frac{\partial E(x)}{\partial c_i^k} \quad (8)$$

wherein in these formulas, y is the target output value part, and y' is a calculation result of formula (3); $\varphi_k(x)$ is a calculation result of formula (1); E(x) is a calculation result of formula (4); $c_k=(c_1^k, c_9^k)$ is the kernel parameter of a radial basis function in the RBFN model; E(x) is a calculation result of formula (4); $x=(x_1, \ldots, x_9)$ is the input condition; a is a learning rate; and is an iteration symbol; and 105) repeating steps 101), 102), 103) and 104) until the prediction error is less than 0.1 mm, and saving the RBFN model parameters.

A further improvement of the present invention lies in that the value of a is 0.1.

A further improvement of the present invention lies in that a specific implementation method of step 2) is as follows:

201) selecting the construction temperature, cement content, mineral material grading, environmental humidity, controlled salt content and compaction method of the cement-stabilized base layer to be designed, and using the same as input parameters $x_1$-$x_7$ of the trained RBFN model;

202) setting the input parameters $x_8$ and $x_9$ of the trained RBFN model as 0;

203) according to the input parameters $x_1$-$x_9$ and the trained RBFN model, predicting the vaulted expansion amount of the cement-stabilized base layer to be designed without the wide expansion seams; wherein if the predicted vaulted expansion amount is less than a control value, no wide expansion seams need to be disposed; and if the predicted vaulted expansion is greater than or equal to the control value, the wide expansion seams need to be disposed, and the control value is determined according to design requirements of the cement-stabilized base layer to be designed; and 204) keeping $x_1$-$x_7$ unchanged, adjusting the values of $x_8$ and $x_9$, and predicting the vaulted expansion amount of the cement-stabilized base layer to be designed under the condition of disposing different wide expansion seams, until finding the condition that the predicted vaulted expansion amount is less than the control value.

A further improvement of the present invention lies in that the values of $x_8$ and $x_9$ are a design width and a design interval of the cement-stabilized base layer to be designed, and the value ranges of $x_8$ and $x_9$ are 0-50 mm and 50 m-150 m respectively.

A further improvement of the present invention lies in that a specific implementation method of step 3) is as follows:

301) according to the situation that the found vaulted expansion amount is less than the control value, determining positions of precut wide expansion seams of the cement-stabilized base layer to be constructed; after the positions of the expansion seams are determined, adjusting the positions of the expansion seams according to a bridge and culvert structure to ensure that at least one expansion seam is disposed between adjacent bridge and culvert structures, and disposing the expansion seams in combination with the positions of construction seams of the cement-stabilized base layer;

302) cutting the precut wide expansion seams according to the design positions of the precut wide expansion seams, wherein a depth of the wide expansion seams is a thickness of the cement-stabilized base layer, or the wide expansion seams are cut after completing the paving of the cement-stabilized base layer;

303) according to the obtained precut width expansion seams, filling the expansion seams after cutting, wherein a material of the expansion seams is selected according to actual conditions; and 304) disposing a glass fiber grid above the wide expansion seams after filling.

The present invention has the following beneficial technical effects:

The present invention provides a method for relieving the vaulted expansion of a cement-stabilized base layer through precut seams. The method can predict the vaulted expansion of the cement-stabilized base layer without precut seams according to existing data. According to the prediction result, whether the precut seams need to be disposed for the cement-stabilized base layer to be designed can be determined without a need to pave a test road, so as to relieve development of the vaulted expansion. The method can predict the vaulted expansion of the cement-stabilized base layer with the precut seams of different sizes according to the existing data. According to the predicted result, the sizes of the precut seams of the cement-stabilized base layer to be designed can be determined without the need to pave the test road. The method can be used for construction of the precut seams according to the determined sizes of the precut seams for the cement-stabilized base layer to be designed. The simple construction process and equipment requirements are conducive to large-scale promotion in Xinjiang and similar regions.

Specifically, the present invention performs the training of the RBFN model according to existing observation data of the vaulted expansion of the cement-stabilized base layers in Xinjiang and similar regions, thereby obtaining a vaulted expansion development law of the cement-stabilized base layers without the precut seams and with the precut seams of different sizes in Xinjiang and similar regions. Therefore, the method is used to predict a vaulted expansion amount of the cement-stabilized base layer to be designed under different conditions, so that whether the precut-seams need to be disposed for the cement-stabilized base layer to be designed and the sizes of the precut seams are determined to relieve the development of vaulted expansion. By the trained RBFN model and the obtained vaulted expansion development law, the vaulted expansion amount of the cement-stabilized base layer with the precut seams of different sizes is predicted, and then the most reasonable sizes of the precut seams are selected for the cement-stabilized base layer to be designed. Based on the traditional construction of the cement-stabilized base layer, only a construction process for the precut seams is added to ensure the construction simplicity of the cement-stabilized base layer with the precut seams.

Further, the present invention can predict based on the existing data to obtain the vaulted expansion development law of the cement-stabilized base layer without the precut seams and with the precut seams of different sizes in Xinjiang and similar regions, thereby ensuring that no paving of the test road is required in the implementation of subsequent steps. Specifically, the present invention performs the training of the RBFN model through the existing observation data of the vaulted expansion of the cement-stabilized base layers in Xinjiang and similar regions, thereby obtaining the vaulted expansion development law of the cement-stabilized base layers without the precut seams and with the precut seams of different sizes in Xinjiang and similar regions. Therefore, the method is used to predict the vaulted expansion amount of the cement-stabilized base layer to be designed under different conditions, so as to further determine whether the precut seams need to be disposed for the cement-stabilized base layer to be designed and the sizes of the precut seams to relieve the development of vaulted expansion.

Further, a reasonable learning rate a value can accelerate a training speed of the RBFN model and a prediction accuracy after the training is completed.

Further, the present invention can predict the vaulted expansion of the cement-stabilized base layer with the precut seams of different sizes according to the existing data. According to the prediction result, there is no need to pave the test road, and the sizes of the precut seams of the cement-stabilized base layer to be designed can be determined. Specifically, the present invention predicts the vaulted expansion amount of the cement-stabilized base layer with the precut seams of different sizes through the trained RBFN model and the obtained vaulted expansion development law, and then selects the most reasonable sizes for the precut seams of the cement-stabilized base layer to be designed.

Further, the design width and interval selection parameters of the cement-stabilized base layer to be designed are quantified to facilitate the RBFN model to predict the vaulted expansion amount of the cement-stabilized base layer with the precut seams of different sizes. Specifically, the present invention can perform the construction of the precut seams according to the determined sizes of the precut seams of the cement-stabilized base layer to be designed. The simple construction process and equipment requirements are beneficial to large-scale promotion in Xinjiang and similar regions.

Further, the present invention only adds a construction process for the precut seams based on the traditional construction of the cement-stabilized base layer, thereby ensuring the construction simplicity of the seam cement-stabilized base layer with the precut seams.

BRIEF DESCRIPTION OF DRAWINGS

FIG. 2($a$) is a top view of a schematic diagram of a method for relieving the vaulted expansion of a cement-stabilized base through precut seams according to the present invention.

FIG. 2($b$) is a sectional view of a schematic diagram of a method for relieving the vaulted expansion of a cement-stabilized base through precut seams according to the present invention.

DESCRIPTION OF REFERENCE SIGNS

1—precut seams, 2—glass fiber grid, 3—hot asphalt, 4—extruded board, 5—coarse-grained asphalt concrete (AC-25), 6—roadbed.

DESCRIPTION OF EMBODIMENTS

The present invention will be further explained below in conjunction with the drawings and embodiments:

The present invention provides a method for relieving the vaulted expansion of a cement-stabilized base layer through precut seams, which includes the following steps.

(1) Training a Radial Basis Function Network (RBFN) Model

Training of the RBFN model refers to the automatic adjustment of RBFN model parameters $w_k$ and $c_k$ is performed according to a vaulted expansion amount of the cement-stabilized base layer under different conditions (such as temperature and stress release structure) in Xinjiang and similar regions, k=1, n, and n is the number of center points. The basic training process may refer to step 1) of the summary of the invention. The RBFN model structure may refer to FIG. 1. In actual implementation, those skilled in the art do not need to perform related operations, and can directly perform subsequent operations according to the content recorded in the subsequent steps in the summary part of the present application. The RBFN model established in the step and the parameters obtained by training are claims of the present application, and may be directly used by those skilled in the art after obtaining authorization and the model. A prediction accuracy of the RBFN model in the present embodiment is 0.1 μm.

A specific implementation method of step 1) is as follow.

101) Values are randomly assigned to the RBFN parameters $w_k$ and $c_k$, an assignment range being [0, 1].

102) A group of vaulted expansion amount data set of the cement-stabilized base layer under different conditions in Xinjiang region is randomly selected, wherein the data set includes two parts: an input condition part $x=(x_1, \ldots, x_9)$ and a target output value part y, and the target output value part y is the group of measured vaulted expansion amounts of the cement-stabilized base layer.

103) The vaulted expansion amount y' of the cement-stabilized base layer is predicted with the RBFN, wherein the process is as shown in formulas (1)-(3);

$$\varphi_k(x) = e^{-(\|x-c_k\|_2)} \quad (1)$$

$$\|x - c_k\|_2 = \frac{\sum_{i=1}^{9}(x_i - c_i^k)^2}{2} \quad (2)$$

$$y' = \sum_{k=1}^{n} \omega_k \varphi_k(x) \quad (3)$$

wherein in these formulas, $x=(x_1, \ldots, x_9)$ is the input condition, $c_k=(c^k_1, c^k_9)$ is the kernel parameter of a radial basis function in the RBFN; $\|\;\|_2$ L is a 2-norm operator; $c^k_i$ is an element of the $c_k$ vector, i=1, ..., 9; and $x_i$ is an element of the x vector, that is, a certain input value, i=1, ..., 9, which respectively corresponds to a construction temperature, a cement content, a mineral material grading, an environmental humidity, a controlled salt content, a compaction method, an expansion seam width, and an expansion seam interval of the cement-stabilized base layer.

104) A prediction error is calculated and the parameters are adjusted, wherein the process is as shown in formulas (4)-(8);

$$E(x) = y - y' \quad (4)$$

$$\frac{\partial E(x)}{\partial w_k} = -E(x)\varphi_k(x) \quad (5)$$

$$\frac{\partial E(x)}{\partial c_i^k} = \frac{\partial E(x)}{\partial w_k} 2e^{-(\|x-c_k\|_2)}(x_i - c_i^k) \quad (6)$$

$$w_k \Rightarrow w_k + \alpha \frac{\partial E(x)}{\partial w_k} \quad (7)$$

$$c_i^k \Rightarrow c_i^k + \alpha \frac{\partial E(x)}{\partial c_i^k} \quad (8)$$

wherein in these formulas, y is the target output value part, and y' is a calculation result of formula (3); $\varphi_k(x)$ is a calculation result of formula (1); E(x) is a calculation result of formula (4); $c_k=(c^k_1, c^k_9)$ is the kernel parameter of a radial basis function in the RBFN; E(x) is a calculation result of formula (4); $x=(x_1, \ldots, x_9)$ is the input condition; a is a learning rate; and is an iteration symbol.

105) Steps 101), 102), 103) and 104) are repeated until the prediction error is less than 0.1 mm, and the RBFN model parameters are saved.

(2) Using the RBFN Model

According to the established RBFN model, the vaulted expansion amount of the cement-stabilized base layer without a wide expansion seam structure and the vaulted expansion amount of the cement-stabilized base layer with different wide expansion seam structures are predicted, so as to determine a reasonable width and a reasonable interval of the wide expansion seams. The specific steps are as follows.

(a) For the cement-stabilized base layer to be designed, the construction temperature of 32° C., the cement content of 4.0%, the mineral material grading of C-B-1, the environmental humidity of 40%, the controlled salt content of 0.2%, and a compaction degree of 98% are determined, i.e., $x_1$-$x_7$ in the drawing "neural structure of radial basis function network", and $x_8$ and $x_9$ are set to 0.

(b) The RBFN model is used to predict that the vaulted expansion amount of the cement-stabilized base layer to be designed is 169.3 μm, which is greater than 100 μm, and the wide expansion seams need to be disposed.

(c) For example, three groups of $x_8$ and $x_9$ combinations, namely 20 mm (width) and 50 m (interval), 50 mm (width) and 50 m (interval), and 50 mm (width) and 150 m (interval) are selected. The RBFN model is used to predict the vaulted expansion amounts of the cement-stabilized base layer under the condition of the three combinations, which are 54.6 μm, 113.4 μm, and 143.7 μm respectively. Therefore, only the design of the wide expansion seams of 20 mm (width) and 50 m (interval) meets the control requirements for the vaulted expansion amount of the cement-stabilized base layer, and 20 mm (width) and 50 m (interval) are used as the design values of the precut wide expansion seams.

(3) Performing a Construction Method for Designing Precut Seams

Figure 2:
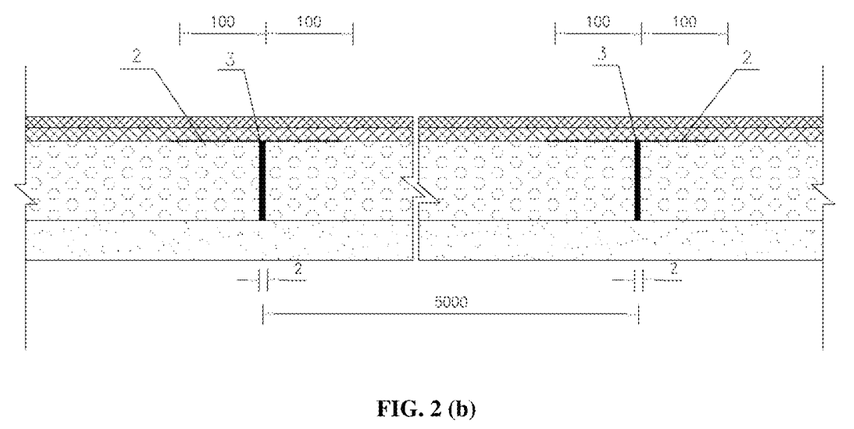
Figure 2A:
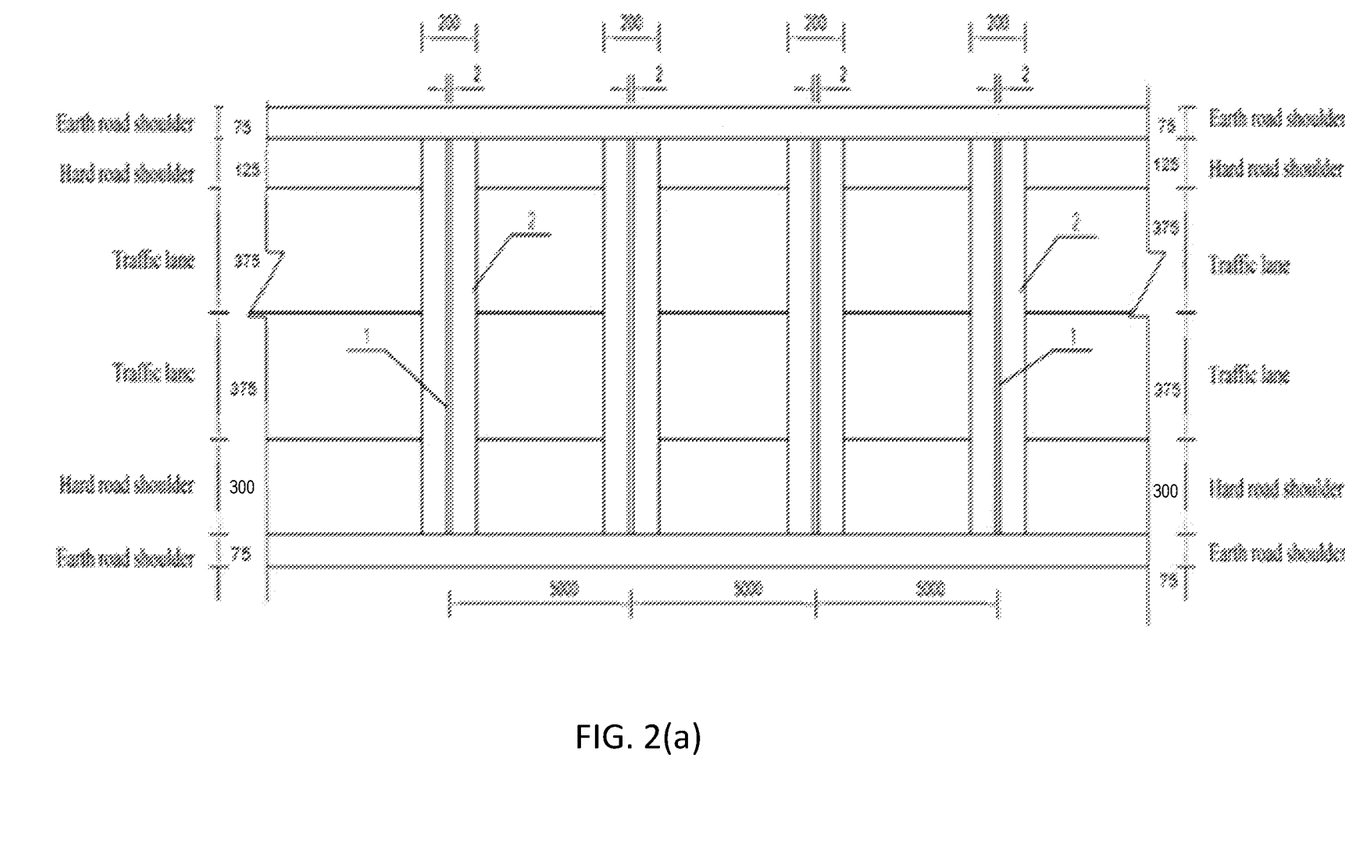

According to the width and interval of the wide expansion seams determined in step (2), the cement-stabilized base layer is constructed on a roadbed 6. Except for a construction process for the precut wide expansion seams, other construction processes for the cement-stabilized base layer are the same as the traditional construction processes for the cement-stabilized base layer. The construction process steps for the precut wide expansion seams are as follows: (a) the positions of the precut wide expansion seams of the cement-stabilized base layer to be constructed are determined according to an interval of 50 m of the precut wide expansion seams, referring to FIG. 2(a) and FIG. 2(b), wherein FIG. 2(a) is a top view and FIG. 2 (b) is a sectional view. After determining the positions of the expansion seams, appropriate adjustments may be made according to a bridge and culvert structure, etc., and at least one expansion seam should be disposed between adjacent bridge and culvert structures. The expansion seams may be disposed in combination with the positions of construction seams of the cement-stabilized base layer.

Figure 3:
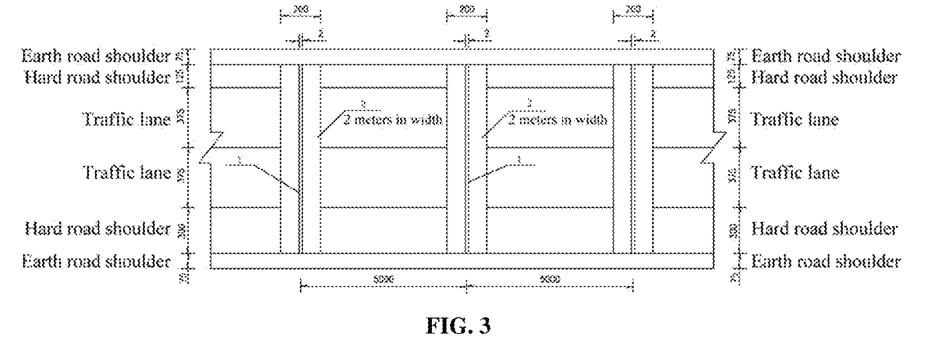
FIG. 3 is a plan view of precut seams of a cement-stabilized base layer according to an embodiment of the present invention (the unit of the numerals in the drawing is cm).

(b) Cutting of the precut wide expansion seams is performed: a depth of the wide expansion seams is a thickness of the cement-stabilized base layer, and the width is 2 mm, referring to FIG. 3. The seams may also be cut after the cement-stabilized base layer is paved.

Figure 4:
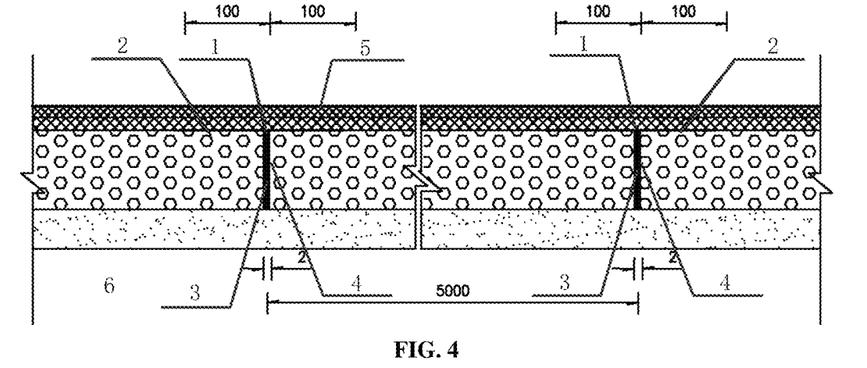
FIG. 4 is a longitudinal plan view of precut seams of a cement-stabilized base layer according to an embodiment of the present invention ((the unit of the numerals in the drawing is cm).

(c) The expansion seams are filled after cutting, referring to FIG. 4. A material for the precut wide expansion seams may be selected according to the actual situation. In the present embodiment, the precut seams 1 are filled with hot asphalt 3, as shown in FIG. 4.

(d) After the filling, a glass fiber grid 2 and an extruded board are disposed above the wide expansion seams. After the glass fiber grid 2 and the extruded board 4 are paved, a lower surface layer material, i.e., coarse-grained asphalt concrete (AC-25) 5 is paved above the cement-stabilized base layer, as shown in FIG. 4.

What is claimed is:

1. A method for relieving vaulted expansion of a cement-stabilized base layer through precut seams, comprising the following steps:
   1) training a radial basis function network (RBFN) model, that is, establishing a mapping relationship between vaulted expansion amounts of the cement-stabilized base layer and different conditions through automatic adjustment of model parameters according to known vaulted expansion amounts of the cement-stabilized base layer under different temperatures and stress release structural conditions in a known region; wherein the training of the RBFN model refers to the automatic adjustment of RBFN model parameters $w_k$ and $c_k$ according to a large number of vaulted expansion amounts of the cement-stabilized base layer under different conditions in the region, $w_k$ and $c_k$ are a parameter weight parameter and a kernel parameter of the RBFN model respectively, $k=1, \ldots, n$, and n is the number of center points, as shown in FIG. 1;
   2) using the RBFN model, that is, according to the mapping relationship established in step 1), predicting the vaulted expansion amount of a cement-stabilized base layer under unknown conditions in the region; and according to the RBFN model trained in step 1), predicting the vaulted expansion amount of a cement-stabilized base layer without wide expansion seam structures and the vaulted expansion amount of a cement-stabilized base layer with different wide expansion seam structures, thereby determining a reasonable width and a reasonable interval of the wide expansion seams; and
   3) performing a construction method for designing precut seams, that is, designing precut wide expansion seams according to the vaulted expansion amount of the cement-stabilized base layer under unknown conditions in the region predicted in step 2); and according to the width and interval of the wide expansion seam determined in step 2), performing construction of the cement-stabilized base layer, wherein except for a construction process for the precut wide expansion seams, the remaining construction processes for the cement-stabilized base layer are the same as the traditional construction processes for the cement-stabilized base layer.

2. The method for relieving vaulted expansion of a cement-stabilized base layer through precut seams according to claim 1, wherein a specific implementing method of step 1) is as follows:
   101) randomly assigning values to the RBFN parameters $w_k$ and $c_k$, an assignment range being [0, 1];
   102) randomly selecting a group of vaulted expansion amount data set of the cement-stabilized base layer under different conditions in the region, wherein the data set comprises two parts: an input condition part $x=(x_1, \ldots, x_9)$ and a target output value part y; $x_1$-$x_9$ are a construction temperature, a cement content, a mineral material grading, an environmental humidity, a controlled salt content, a compaction method, an expansion seam width and an expansion seam interval of the cement-stabilized base layer respectively; and the target output value part y is a group of measured vaulted expansion amounts of the cement-stabilized base layer;
   103) predicting the vaulted expansion amount y' of the cement-stabilized base layer with the RBFN model, wherein the process is as shown in formulas (1)-(3);

$$\varphi_k(x) = e^{-(\|x-c_k\|_2)} \quad (1)$$

$$\|x-c_k\|_2 = \frac{\sum_{i=1}^{9}(x_i - c_i^k)^2}{2} \quad (2)$$

$$y' = \sum_{k=1}^{n} \omega_k \varphi_k(x) \quad (3)$$

wherein in these formulas, $x=(x_1, \ldots, x_9)$ is the input condition, $c_k=(c_1^k, \ldots, c_9^k)$ is the kernel parameter of a radial basis function in the RBFN model; $\|\ \|_2$ is a 2-norm operator; $c_i^k$ is an element of a $c_k$ vector, $i=1, \ldots, 9$; and $x_i$ is a certain element of the x vector, that is, a certain input value, $i=1, \ldots, 9$, which respectively corresponds to the construction temperature, the cement content, the mineral material grading, the environmental humidity, the controlled salt content, the compaction method, the expansion seam width, and the expansion seam interval of the cement-stabilized base layer;

104) calculating a prediction error and adjusting the parameters, wherein the process is as shown in formulas (4)-(8);

$$E(x) = y - y' \quad (4)$$

$$\frac{\partial E(x)}{\partial w_k} = -E(x)\varphi_k(x) \quad (5)$$

$$\frac{\partial E(x)}{\partial c_i^k} = \frac{\partial E(x)}{\partial w_k} 2e^{-(\|x-c_k\|_2)}(x_i - c_i^k) \quad (6)$$

$$w_k \Rightarrow w_k + \alpha \frac{\partial E(x)}{\partial w_k} \quad (7)$$

$$c_i^k \Rightarrow c_i^k + \alpha \frac{\partial E(x)}{\partial c_i^k} \quad (8)$$

wherein in these formulas, y is the target output value part, and y' is a calculation result of formula (3); $\varphi_k(x)$ is a calculation result of formula (1); E(x) is a calculation result of formula (4); $c_k=(c_1^k, \ldots, c_9^k)$ is the kernel parameter of a radial basis function in the RBFN model; E(x) is a calculation result of formula (4); $x=(x_1, \ldots, x_9)$ is the input condition; $\alpha$ is a learning rate; $\Rightarrow$ and is an iteration symbol; and 105) repeating steps 101), 102), 103) and 104) until the prediction error is less than 0.1 mm, and saving the RBFN model parameters.

3. The method for relieving vaulted expansion of a cement-stabilized base layer through precut seams according to claim 2, wherein the value of $\alpha$ is 0.1.

4. The method for relieving vaulted expansion of a cement-stabilized base layer through precut seams according to claim 2, wherein a specific implementation method of step 2) is as follows:
   201) selecting the construction temperature, cement content, mineral material grading, environmental humidity, controlled salt content and compaction method of the cement-stabilized base layer to be designed, and using the same as input parameters $x_1$-$x_7$ of the trained RBFN model;

202) setting the input parameters $x_8$ and $x_9$ of the trained RBFN model as 0;

203) according to the input parameters $x_1$-$x_9$ and the trained RBFN model, predicting the vaulted expansion amount of the cement-stabilized base layer to be designed without the wide expansion seams; wherein if the predicted vaulted expansion amount is less than a control value, no wide expansion seams need to be disposed; and if the predicted vaulted expansion is greater than or equal to the control value, the wide expansion seams need to be disposed, and the control value is determined according to design requirements of the cement-stabilized base layer to be designed; and 204) keeping $x_1$-$x_7$ unchanged, adjusting the values of $x_8$ and $x_9$, and predicting the vaulted expansion amount of the cement-stabilized base layer to be designed under the condition of disposing different wide expansion seams, until finding the condition that the predicted vaulted expansion amount is less than the control value.

5. The method for relieving vaulted expansion of a cement-stabilized base layer through precut seams according to claim 4, wherein the values of $x_8$ and $x_9$ are a design width and a design interval of the cement-stabilized base layer to be designed, and the value ranges of $x_8$ and $x_9$ are 0-50 mm and 50 m-150 m respectively.

6. The method for relieving vaulted expansion of a cement-stabilized base layer through precut seams according to claim 4, wherein a specific implementation method of step 3) is as follows:

301) according to the situation that the found vaulted expansion amount is less than the control value, determining positions of precut wide expansion seams of the cement-stabilized base layer to be constructed; after the positions of the expansion seams are determined, adjusting the positions of the expansion seams according to a bridge and culvert structure to ensure that at least one expansion seam is disposed between adjacent bridge and culvert structures, and disposing the expansion seams in combination with the positions of construction seams of the cement-stabilized base layer;

302) cutting the precut wide expansion seams according to the design positions of the precut wide expansion seams, wherein a depth of the wide expansion seam is a thickness of the cement-stabilized base layer, or the wide expansion seams are cut after completing the paving of the cement-stabilized base layer;

303) according to the obtained precut width expansion seams, filling the expansion seams after cutting, wherein a material of the expansion seams is selected according to actual conditions; and 304) disposing a glass fiber grid above the wide expansion seams after filling.

\* \* \* \* \*